United States Patent [19]
Barr et al.

[11] 3,718,052
[45] Feb. 27, 1973

[54] GEAR STRUCTURE AND METHOD OF MAKING THE SAME

[75] Inventors: William A. Barr, Milwaukee; Edwin C. Hahlbeck, Greendale; Ferdinand L. Heine, Milwaukee, all of Wis.

[73] Assignee: Milwaukee Gear Company, Milwaukee, Wis.

[22] Filed: April 5, 1971

[21] Appl. No.: 131,241

Related U.S. Application Data

[63] Continuation-in-part of Ser. No. 10,483, Feb. 11, 1970.

[52] U.S. Cl. ....................................74/462, 29/159.2
[51] Int. Cl. .....................F16h 55/06, B21d 53/28
[58] Field of Search ..............74/462, 422; 29/159.2

[56] References Cited

UNITED STATES PATENTS 2,869,389   1/1959   Proefke....................................74/462

*Primary Examiner*—Leonard H. Gerin
*Attorney*—Thomas O. Kloehn and Allan W. Leiser

[57] ABSTRACT

The manufacture of racks includes mounting of the rack elements relative to a meshing gear using as a reference only the operating pitch surfaces of the rack elements. Rack elements with different body dimensions mounted end to end to form a smooth rack. Rack elements mounted side-by-side with nonparallel standard pitch surfaces effect new modifications in axial tooth thickness. Rack elements with varying discrepancies in axial tooth thicknesses mounted together or separately produce a correct spur rack.

12 Claims, 11 Drawing Figures

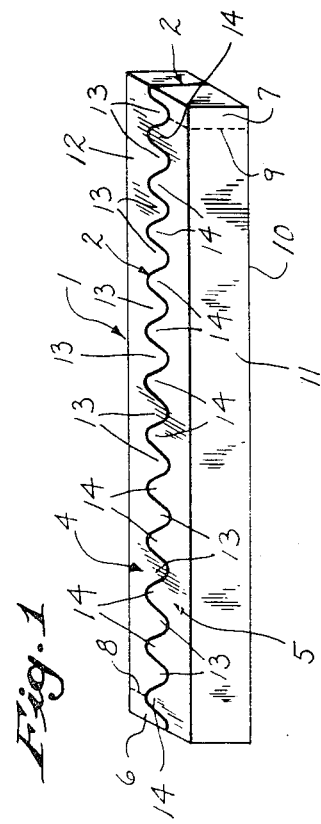
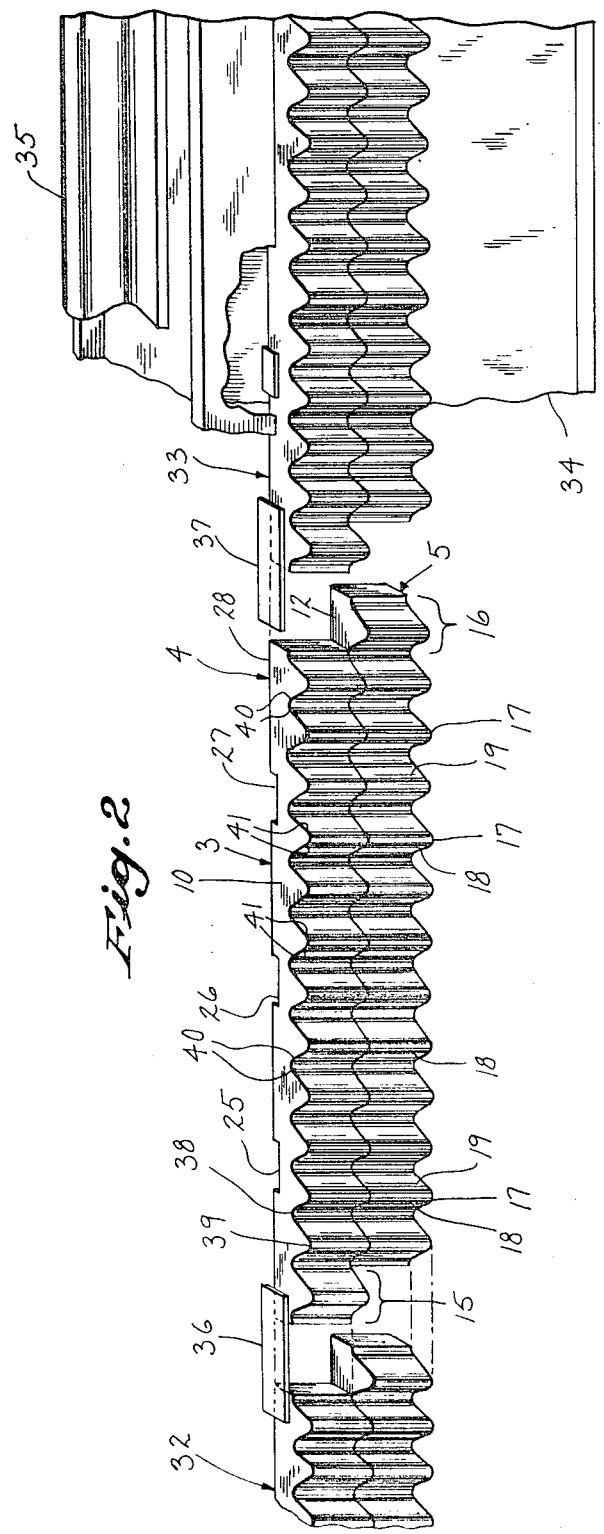

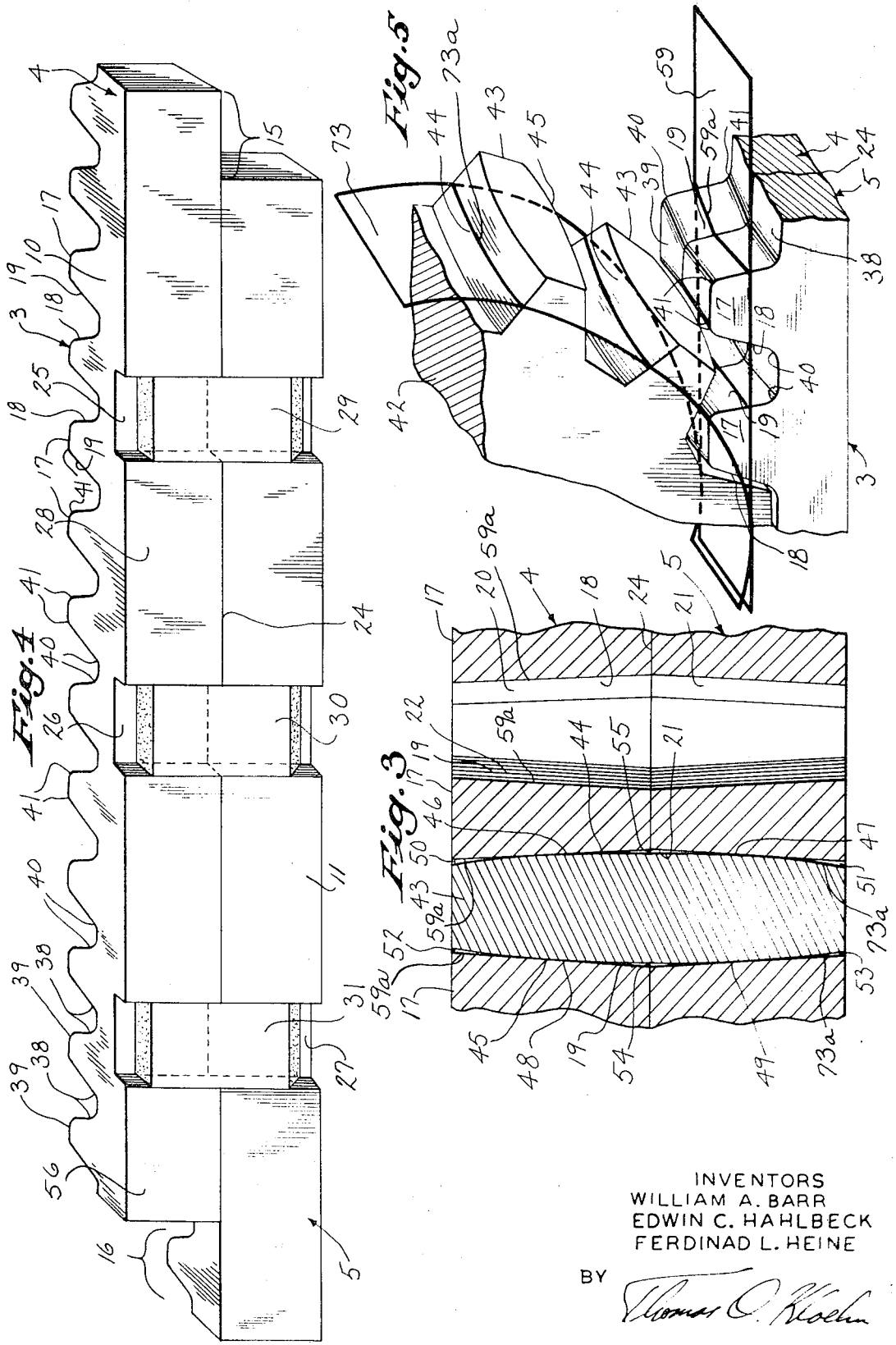

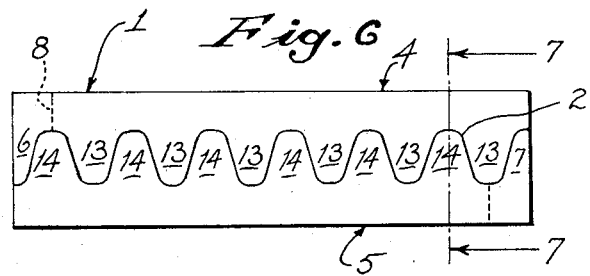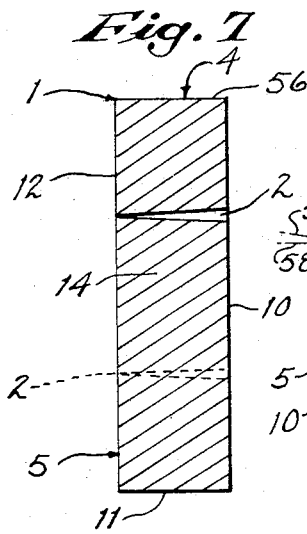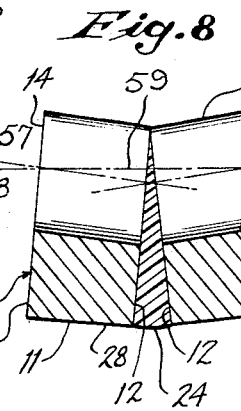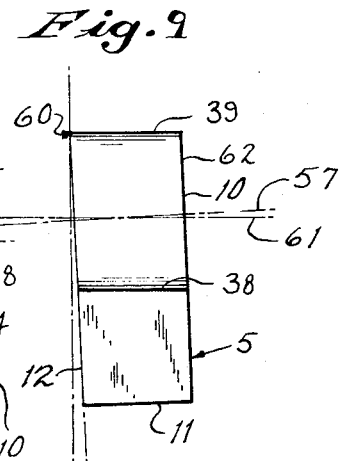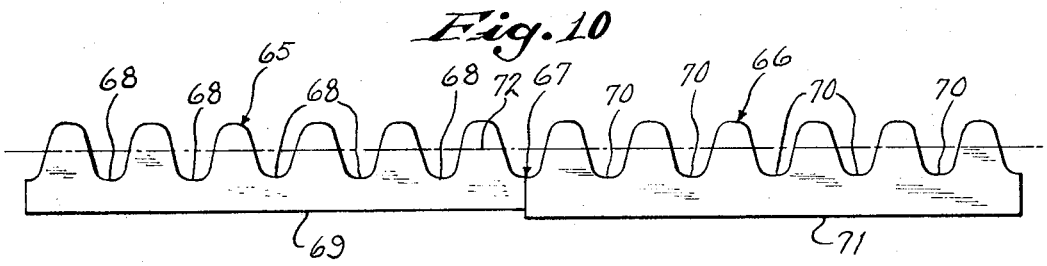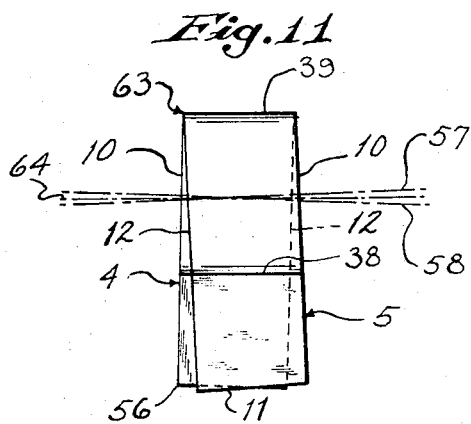

GEAR STRUCTURE AND METHOD OF MAKING THE SAME

This application is a continuation-in-part of application Ser. No. 10,483, filed Feb. 11, 1970.

BACKGROUND OF THE INVENTION

Customarily gear members of all sorts are manufactured by precisely shaping and locating the dentate profile of the gear member with respect to some locating reference surface on the gear member, which in turn is determined so as to maintain a precise operating center distance or mounting distance within close tolerances of a theoretical center distance or mounting distance. For conventional round gears, such as spur gears, the first step in design is to calculate the standard center distance and the standard pitch surface, and the second step os to locate the actual operating center distance and operating pitch surface. Then the dentate profile is designed with respect to some fixed reference to withstand the anticipated stresses and to produce the desired operations based on the calculations of standard and operating center distances and pitch surfaces. For a spur or helical gear, the center of the gear is critical. For those types of gears which do not have a center distance dimension, a mounting distance is calculated with respect to some locating surface on the gear members. Similarly, the back surface of a rack, as its mounting surface, provides the locating surfaces on the basis of which the dentate profile is designed and manufactured. Tolerances are of critical importance, particularly as they tend to accumulate. This approach to gear manufacture depends on two basic assumptions: (1) the capability to manufacture the gear member so that all of its surfaces are located within the necessary tolerances; and (2) the fact that the means on which the gear in operation is mounted and supported will locate the reference surface or lines precisely within the calculated tolerances. In self-contained machinery of sizes within the capability of the gear manufacturing equipment, these assumptions are often readily realized.

However, there are a growing number of situations where those two assumptions cannot be depended upon or realized. For example, in traction systems, particularly, some of the gear members may be too large to be manufactured practicably or economically using conventional gear forming techniques and machinery, though this problem may also occur in other situations. Also, in traction systems, though perhaps in other applications too, the gear system may not be self-contained so that the operating mounting distances or centering distances, and hence the operating pitch surfaces cannot be depended upon to coincide with any previous calculations or allowable tolerances. Also, some gear tooth configurations that would aid in the meshing of the gear teeth are not readily formed on existing conventional machinery. Finally, new gear cutting techniques, such as flame cutting, have been developed and present many advantages, but they cannot always form gear teeth within all of the necessary tolerances. For these situations, when one or the other or both of the cardinal assumptions mentioned above cannot be realized practicably, some means is needed to circumvent those assumptions, and the present invention satisfies that need.

SUMMARY OF THE INVENTION

The present invention relates to a gear and a method for making the same, and more particularly the invention resides in a gear element which has a plurality of spaced apart teeth, which is so formed as to define a standard pitch surface, and which is located in a position for meshing engagement with another, and said position of the gear element is such as to effect through said teeth an operating pitch surface which is displaced from said standard pitch surface to achieve a desired axial configuration of said teeth on a normal section coincident with said operating pitch surface; and the invention resides in a method whereby a first gear element with a plurality of teeth defining a standard pitch surface is located for meshing engagement with a second gear element to define an operating pitch surface, and said first gear element is located for meshing engagement by reference to said operating pitch surface such that said operating pitch surface is displaced from said standard pitch surface to effect a desired axial tooth configuration of said teeth on a normal section of said first gear element taken along said operating pitch surface.

The present invention circumvents the two assumptions referred to above by mounting the gear element using as a reference a desired operating pitch surface which will be defined by its operation with a meshing gear. By eliminating the locating surfaces or reference lines, which have been relied upon by the prior art for manufacturing and mounting ears, all of the dimensions and tolerances relating thereto are also eliminated. By referencing the teeth directly to the operating pitch surface, discrepancies in circular tooth thickness are inherently corrected, or if circular tooth thickness modifications are desired, these are achieved by the positioning of the gear. There the locating, which may be the assembly of two or more gear elements together or the mounting of one or more members, becomes a step in the manufacture of the completed gear member, even though it may be performed outside of the factory that produced the toothed gear element and by a different party from the manufacturer of the gear element.

This novel departure from prior art gear structures and manufacturing techniques produces a number of objects and advantages including the relaxation of some prior art manufacturing tolerances, the direct control of the meshing of mating gear members in a set, the achievement of gear tooth configurations the manufacture of which had previously been impracticable; the resulting improvement in load distribution, power rating, strength, durability and/or life, in addition to smoothness of operation and reduced manufacturing costs.

BRIEF DESCRIPTION OF THE DRAWINGS

In the drawings:

FIG. 1 is an isometric view of a steel blank from which rack elements are flame cut, FIG. 2 is an isometric view of a rack for a traction system embodying the present invention, FIG. 3 is a view on a normal section of a crowned pinion tooth in mesh with a rack embodying the present invention, FIG. 4 is an isometric view from the back of a rack embodying the present invention, FIG. 5 is an isometric view of a portion of a crown tooth pinion meshing with a rack embodying the present invention including representations of the operating pitch surfaces and their lines of intersection with their respective teeth, FIG. 6 is a plan view of a blank from which a rack element is flame cut, FIG. 7 is an end elevation taken along the line 7—7 in FIG. 6 of the blank from which rack elements have been flame cut, FIG. 8 is a side elevation of a rack embodying the present invention, FIG. 9 is an end view of a rack embodying the present invention, FIG. 10 is an end view of another rack embodying the present invention, FIG. 11 is an end elevation of another rack embodying the present invention.

DETAILED DESCRIPTION OF THE PREFERRED EMBODIMENT

Definitions:

The following terms are used in this specification as defined below. The following definitions, for the most part, have been extracted from the American Gear Manufacturers Association Standard Gear Nomenclature (AGMA 112. 04 ), and for those terms which do not appear in the AGMA Nomenclature the definitions are based on usage in the *Gear Handbook* Edited by Darle W. Dudley, First Edition, McGraw-Hill Book Company, 1962.

Axial plane: for a pair of gears, a plane containing both axes; and in a single gear, a plane containing the axis of that gear and some other point.

Body: that portion of the gear that carries the teeth.

Bottom land: the surface at the bottom of a tooth space adjoining the fillets.

Circular thickness: the length of arc between the two sides of a gear tooth on the pitch circle, (the arc in a rack is a straight line) unless otherwise specified.

Crowned teeth: teeth with their surfaces modified in the lengthwise directions to produce localized contact.

Face width: the length of the tooth in an axial plane.

Fillet: the concave portion of the tooth profile where it joins the bottom of the tooth space.

Gear: any machine part with gear teeth.

Normal plane: an imaginary plane normal to a tooth surface at a pitch point and perpendicular to the pitch plane.

Normal section: the shape of the gear tooth as seen in an imaginary plane tangent to the pitch surface.

Operating pitch diameter: pitch diameter determined from the number of teeth and the center distance at which gears operate.

Pitch: the distance between similar, equally spaced tooth surfaces along a given line or curve.

Pitch diameter: diameter of a pitch circle. In spur and helical gears, unless otherwise specified, pitch diameter is related to the number of teeth and the standard transverse pitch.

Pitch plane: an imaginary plane perpendicular to the axial plane of two gears and tangent to the pitch surfaces; in one gear, the plane tangent to its pitch surface; coincident with the pitch surface.

Pitch surfaces: imaginary planes, cylinders or cones that roll together without slipping.

Rack: a gear with teeth spaced along a straight line and suitable for straight-line motion.

Standard pitch diameter: the pitch diameter calculated according to the standard pitch of the gear-cutting tool.

Tip round: a surface which separates the active profile from the top land a form of profile modification.

Tooth profile: one side of a tooth in cross section between the outside circle and the root circle.

Tooth surface: the side of a gear tooth.

Top land: the surface of a top of a tooth.

Transverse plane: an imaginary plane perpendicular to the axial plane and to the pitch plane.

Description:

Gear material 1, which is a rectangular solid of an appropriate steel, is shown with a kerf 2 flame cut lengthwise down its center so as to define a dentate profile of a rack 3 to be made. The kerf 2 cuts two, substantially identical rack elements 4 and 5 from the single steel blank 1, but each of the rack elements 4 and 5 has a half-tooth 6 and 7, respectively, at one end, and these half-teeth 6 and 7 are cut off at the rack end lines 8 and 9, respectively, indicated in broken lines in FIG. 1. The blank 1 is shown with its torch side 10 up and a back surface 11 of the lower rack element 5 in the foreground, with a blow-out side 12 opposite the torch side 10 and a back surface 56 of the upper rack element 4 being hidden from view. The blank 1 is also illustrated in elevation in FIG. 6 and an end view in section is shown in FIG. 7. In FIG. 7, the configuration of the kerf 2 is exaggerated to illustrate the tapering of the kerf 2 from the torch side 10 to the blow-out side 12.

In FIGS. 2, 4 and 8, the rack elements 4 and 5 are shown assembled together to form a completely assembled rack 3 with some exaggeration to show clearly some of the salient characteristics of the assembly 3. The rack 3 is made by locating the rack elements 4 and 5 together so that the torch sides 10 of each of the rack elements 4 and 5 are next to one another and the blow-out sides 12 from the exterior sides of a completed rack 3. By cutting off the half-teeth 6 and 7 along the end lines 8 and 9, and off-setting the rack elements 4 and 5 one pitch 15 and 16, successive rack segments 32 and 33 can be end mounted together with perfectly uniform pitches at the junctions so that a pinion rolling along the rack will move smoothly from one segment 32 to the next 33. This overlap effected by the off-sets 15 and 16 also provides for a stronger joint between successive rack segments 32 and 33.

The assembled rack elements 4 and 5 have their teeth 13 and 14 perfectly aligned to form a completed rack tooth 17. Each rack tooth 17 has tooth surfaces 18 and 19, respectively, on opposite sides, and each tooth surface 18 and 19 has two facets 20 and 21, and 22 and 23, respectively. The facets 20–23 of the tooth surfaces 18 and 19 are the surfaces of the teeth 13 and 14, respectively, of the rack elements 4 and 5. The rack elements 4 and 5 are joined by a layer of epoxy resin 24 between the adjacent torch sides 10 of the two rack elements 4 and 5. Also, channels 25, 26 and 27 are milled across a back surface 28 of the completed rack 3 to receive shear plates 29, 30 and 31, respectively, which fit tightly in the channels 25–27 and are welded in place.

The rack 3 in its application in a traction system is mounted on a steel web 34 that supports a rail 35 on which one side of a gantry crane (not shown) rides. Tie plates 36 and 37 are used to join the overlapping ends of the successive rack segments 32 and 33, and the tie plates 36 and 37 are also welded to the webs 34 to mount the racks 3.

The rack teeth 17 are spaced apart and the bottom surface of the space separating the teeth 17 is known as the bottom or root land 38 and the top surface of each of the teeth 17 is known as the top land 39. The tooth surfaces 18 and 19 join the bottom lands 38 in a concave curve known as a fillet 40, and the tooth face surfaces 18 and 19 meet the top lands 39 in convex curves known as tip rounds 41. The fillets 40 are formed to add strength to the teeth 17 at their root ends, since the root of the tooth bears most of the stress of tooth deflection under load and is subject to fatigue stress. The fillets 40 serve to strengthen the tooth in that regard. The tip rounds 41 constitute a profile modification of the teeth which aids in the meshing of the teeth 17 with the mating members. Because the rack elements 4 and 5 are opposite halves of the same blank 1, the teeth 13 of the rack element 4 forming the spaces between the teeth 14 of the rack element 5 and visa versa, the tip rounds 41 of one form the inner and sharper radius of the fillets 40 of the other, and the relationship between the two is an optimum relationship for each to give the teeth 17 the maximum strength while eliminating, as far as possible, edge chipping at the tip edge due to mismesh. This is particularly important in a traction system where the two meshing members cannot be rigidly mounted within a common frame.

A drive spur pinion 42 engages the racks 3 and is illustrated isometrically in part in FIG. 5. The spur pinion 42 has involute teeth 43 with crowned faces 44 and 45. By mounting the torch sides 10 of the rack elements 4 and 5 in side by side relationship, the natural taper of kerf 2 decreases the circular thickness of the tooth from the torch side 10 to the blow-out side 12 will tend to produce a rack tooth 17, which in normal section, as is shown in FIG. 3, can be seen to have two facets 20 and 21, and 22 and 23 on each tooth surface 18 and 19, respectively, which converge towards one another giving the teeth 17 in normal section a concave configuration. According to the present invention, however, that tooth shape in normal section need not depend upon an initial shaping of the teeth 13 and 14 of the rack elements 4 and 5, but it can also be effected by the manner in which the rack elements 4 and 5 are assembled as can be seen in FIG. 8. FIG. 8 shows the top lands 39 of the teeth 14 and 15 of the elements 4 and 5 almost tight together whereas the bottom surfaces 11 and 56 of the elements 4 and 5 are spaced wide apart by the epoxy resin 24. By thus canting the two elements 4 and 5, an existing concavity of a completed tooth 17 can be magnified, or a concavity in the tooth 17 can be effectively created where no attention in the circular thickness of the element teeth exists at all.

The effect of this concavity in the faces 18 and 19 of the teeth 17 is illustrated in FIG. 3 which shows the rack teeth 17 and one pinion tooth 43 in a normal section view. The pinion teeth 43 are crowned by relieving the longitudinal ends of the tooth surfaces 44 and 45 on the teeth 43. Hence when the pinion tooth 43 meshes with the rack teeth 17, contact areas 46, 47, 48 and 49 are formed between the pinion teeth 43 faces 44 and 45, respectively, and the facets 20-23 of the faces 18 and 19 of the rack teeth 17, creating two areas of contact 46-49 on each tooth face 18, 19 and 44, 45. At the ends of the teeth there are clearances 50, 51, 52 and 53 between the surfaces 44 and 45 of the pinion teeth 43 and the surfaces 18 and 19 of the rack teeth 17. Also, there are center clearances 54 and 55 between the rack teeth surfaces 18 and 19 and the pinion teeth surfaces 44 and 45. This tooth configuration prevents end loading and serves to distribute the load, maximizing the rating and the life of both gears 3 and 43.

In designing the dentate profile for the rack 3, which is cut in the blank 1 by the kerf 2, standard pitch surfaces 57 and 58 are calculated which in the instance are imaginary planes 57 and 58. The standard pitch surfaces 57 and 58 are illustrated in FIGS. 8, 9 and 11 by broken lines in the conventional manner and these are calculated on the basis of the configuration of the teeth 13 and 14 and the standard pitch diameter. When the gear rack 3 is put into use, its mesh with a mating gear defines its operating pitch surface 59, which is determined by the operating pitch diameter, which in turn depends upon the center distances at which the gears operate. Like the standard pitch surfaces 57 and 58, the operating pitch surface 59 is an imaginary plane 59 which would intersect with the rack teeth 17 along the lines 59a. As shown in FIG. 5 the spur gear 43 has a cylindrical operating pitch surface 73 (the standard pitch surface of the spur gear 43 is not shown), which is also an imaginary plane that would intersect with the pinion tooth surfaces 44 and 45 along the lines 73a.

According to the prior art the operating pitch surface 59 should be made to coincide with the standard pitch surfaces 57 and 58, but such a coincidence can occur only if the operating center distances are exactly identical to the standard center distances. Since perfect identity of operating and standard center distances cannot be obtained in practice the prior art allows the operating pitch surface 59 to deviate from the standard pitch surfaces 57 and 58 within critically close manufacturing and mounting tolerances.

By contrast, the present invention intentionally angularly displaces the operating pitch surface 59 from the standard pitch surfaces 57 and 58 to produce a desired tooth configuration taken on a normal section coincident with the operating pitch surface 59. This is accomplished by using the desired operating pitch surface 59 as the reference for locating the gear rack 3. In the first embodiment, this principle is applied in both the assembly and mounting of the rack 3. The rack elements 4 and 5 are located and assembled as shown in FIG. 8 so that the standard pitch surfaces 57 and 58 are displaced from the operating pitch surface 59 to effect the concave normal section of the teeth 17 at the operating pitch surface 59. This is achieved by having the operating pitch plane 59 intersect the sloping tooth 17 profile closer to the top land 39 in the center of the tooth 17 and closer to the bottom land 38 at the outside edges of the tooth 17. When the assembled rack 3 is mounted, it is located with reference to the operating pitch surface 59 and fixed in position. Both the assembly and the mounting can be accomplished using the meshing pinion 43, but it is more convenient to use a dummy pinion tooth in a locating jig. Such a jig is disclosed in the copending application of Edwin C. Hahlbeck, Ser. No. 146,715 filed on May 25, 1971.

In a second embodiment shown in FIG. 9, the single rack element 5, as properly located, is the rack 59. The taper of the tooth 14 due to the taper of the kerf 2 would have an undesirable effect if the rack element 5 were mounted with reference to its back surface 11 as is done by the prior art. However, if the rack element 5 is located and mounted according to the present invention so that its operating pitch surface 61 is displaced from its standard pitch plane 57 to be closer to the top land 39 at the torch side 10 and closer to the bottom land 38 at the blow-out side 12, the configuration of a tooth 62 of the rack 60 on a normal section along its operating pitch surface 61 is a perfect rectangle. In the embodiment shown in FIG. 9, therefore, the displacement of the operating pitch surface 61 from the standard pitch surface 57 utilizes the slope of the profile of the teeth 14 to correct the taper in the circular thickness of the element teeth 14 for practical operating purposes.

A third embodiment, which is illustrated in FIG. 11, is made up of a series of rack elements 4 and 4 mounted end to end to form a gear rack 63. The mounting of the rack elements 4 and 5 disregards the direction of the taper in circular thickness of the teeth 13 and 14 due to the spreading of the kerf 2. By mounting the rack elements 4 and 5 with reference only to a desired operating pitch surface 64 for the completed rack 63, the tooth configuration on a normal section coincident with the operating pitch surface 64 can be made a perfect rectangle throughout the entire length of the rack 63. As is illustrated in FIG. 11, the standard pitch surfaces 57 and 58 and axial planes of the rack elements 4 and 5 may criss-cross each other, making the side surfaces 10 and 12 as well as the back surfaces 11 and 56 be out of alignment. However, in operation the meshing member will see only the configuration of the teeth 13 and 14 on the normal section, so that the misalignments of the side surfaces 10 and 12 and the bottom surfaces 11 and 56, while perhaps not aesthetically pleasing, may be ignored.

Still another embodiment of the invention is illustrated in FIG. 10 where two rack elements 65 and 66 are mounted end to end to complete a single rack 67. However, the rack elements 65 and 66 have different body dimensions in that the distance from root lands 68 to a back surface 69 on one rack element 65 is less than the distance from root lands 70 to back surface 71 of the other element 66. If these rack elements 65 and 66 were mounted in the conventional fashion, an operating pitch plane for the rack element 65 on the left would be too high and too low for the rack element 66 on the right, and the entire rack 67 would be unsatisfactory. However by mounting the rack elements 65 and 66 with reference only to a desired operating pitch surface 72 for the completed rack 67, regardless of the location of the back surfaces 69 and 71, the operating pitch surface 72 may be ideally located for both elements 65 and 66 of the rack 67.

The foregoing description of the preferred embodiments illustrates the present invention and the manner in which the mentioned objects and advantages are brought about. The embodiments demonstrate several instances in which dimensions that in the prior art had to be achieved within close tolerances in the present invention become virtually open tolerances. Also, the manner in which certain defects, which had limited the use of flame cutting techniques, can readily be corrected, is shown. Finally, means and methods for achieving new gear tooth configurations are shown, with attendant advantages. While all of the embodiments show only racks, the invention is not deemed limited to racks, but instead may be applicable to gears of any shape. Manifestly, then, the above described embodiments do not limit the invention but merely represent the best modes presently contemplated by the inventors for carrying out their invention. The subject matter considered to be the invention is particularly pointed out and distinctly claimed in the claims that follow.

We claim:
1. A gear comprising the combination of
   a gear member having a plurality of spaced apart teeth defining a standard pitch surface through said teeth;
   said spaced apart teeth being located relative to a meshing gear to define an operating pitch surface of said gear member;
   said gear member being mounted for operation so as to angularly displace said operating pitch surface from said operating pitch surface from said standard pitch surface to achieve a desired tooth shape on a normal section coincident with said operating pitch surface.
2. A gear as set forth in claim 1, wherein
   said gear member includes at least two substantially identical gear elements assembled in side-by-side alignment, each of said gear elements having a standard pitch surface, and said gear elements being located relative to one another such that said standard pitch surfaces of said gear elements do not coincide when extended.
3. A gear as set forth in claim 2, wherein
   said gear member is a rack and said gear elements are rack elements.
4. A gear as set forth in claim 3, wherein
   said standard pitch surfaces intersect.
5. A gear as set forth in claim 4, wherein
   said desired tooth shape has concave tooth surfaces.
6. A gear as set forth in claim 1, wherein
   said gear member is a rack including a plurality of rack elements mounted end to end, said rack elements having standard pitch surfaces and different body dimensions from root lands between said teeth to back surfaces of said rack elements.
7. A gear as set forth in claim 1, wherein
   said teeth of said gear member being tapered in circular thickness on a normal section coincident with said standard pitch surface;
   and said gear member is located so that said tooth shape on a normal section coincident with said operating pitch surface is not tapered.
8. A gear as set forth in claim 4, wherein
   said gear member is a rack with a plurality of rack elements mounted end-to-end, each of said rack elements defining a standard pitch surface and the teeth of at least one of said rack elements being tapered in circular thickness on a normal section coincident with its standard pitch surface.

9. A method of making a gear with a desired effective tooth shape on a normal section at the operating pitch surface, comprising the steps of
forming a gear element with a plurality of spaced apart teeth having a predetermined standard pitch surface;
locating said gear element relative to a meshing gear having a plurality of spaced apart teeth so that when said spaced apart teeth of said gear element and said meshing gear engage in meshing relationship an operating pitch surface for said gear element is defined;
and fixing said location of said gear element to form a completed gear with said operating pitch surface displaced from said standard pitch surface to achieve a desired tooth shape for said teeth of said gear at a normal section taken along said operating pitch surface.

10. A method of making a gear as set forth in claim 9, wherein
a plurality of said gear elements are assembled in side-by-side alignment relative to said operating pitch surface such that said standard pitch surfaces intersect when extended.

11. A method of making a gear as set forth in claim 9, wherein
a plurality of said gear elements with different body dimensions are mounted end-to-end;
and said desired tooth shape includes uniform dimensions.

12. A method as set forth in claim 9, wherein
said gear element is formed so that said teeth taper in circular thickness along a normal section coincident with said standard pitch surface;
and said desired tooth shape is not tapered.

* * * * *